US012627176B2

(12) United States Patent
Ahn et al.

(10) Patent No.: US 12,627,176 B2
(45) Date of Patent: May 12, 2026

(54) DUAL-MODE MULTI-COIL WIRELESS POWER TRANSFER SYSTEM

(71) Applicant: KOREA ADVANCED INSTITUTE OF SCIENCE AND TECHNOLOGY, Daejeon (KR)

(72) Inventors: Seungyong Ahn, Daejeon (KR); Semin Choi, Daejeon (KR); Sungryul Huh, Daejeon (KR); Haerim Kim, Daejeon (KR); Seongho Woo, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 281 days.

(21) Appl. No.: 18/508,560

(22) Filed: Nov. 14, 2023

(65) Prior Publication Data

US 2024/0195226 A1     Jun. 13, 2024

(30) Foreign Application Priority Data

Dec. 12, 2022    (KR) ......................... 10-2022-0172961

(51) Int. Cl.
*H02J 50/40*          (2016.01)
*H02J 50/12*          (2016.01)
*H02J 50/70*          (2016.01)

(52) U.S. Cl.
CPC ............ *H02J 50/402* (2020.01); *H02J 50/12* (2016.02); *H02J 50/70* (2016.02)

(58) Field of Classification Search
CPC .......... H02J 50/402; H02J 50/12; H02J 50/70; H01F 27/288
See application file for complete search history.

(56) References Cited

U.S. PATENT DOCUMENTS

| | | | | |
|---|---|---|---|---|
| 9,368,274 B2 * | 6/2016 | Xu | ......................... | H02J 50/402 |
| 2011/0095618 A1 * | 4/2011 | Schatz | ..................... | H03H 7/40 |
| | | | | 307/104 |
| 2014/0021795 A1 * | 1/2014 | Robertson | ............... | H02J 50/80 |
| | | | | 307/104 |
| 2016/0284465 A1 * | 9/2016 | Maniktala | ............... | H02J 50/12 |
| 2017/0018971 A1 * | 1/2017 | Oshima | ................... | H01F 38/14 |
| 2018/0090974 A1 * | 3/2018 | Elkayam | ............... | H02J 50/402 |
| 2019/0027298 A1 * | 1/2019 | Jadidian | ................. | H02J 50/70 |
| 2019/0084433 A1 * | 3/2019 | Wang | ....................... | H02J 50/12 |
| 2020/0328626 A1 * | 10/2020 | Maniktala | ............... | H02J 50/10 |
| 2021/0328461 A1 * | 10/2021 | Han | ........................ | H02J 50/70 |
| 2022/0102995 A1 * | 3/2022 | Fieldbinder | ......... | H02J 7/00036 |
| 2022/0320908 A1 * | 10/2022 | Yoon | ....................... | H02J 50/12 |

FOREIGN PATENT DOCUMENTS

| | | | |
|---|---|---|---|
| JP | 2011199975 A | * | 10/2011 |
| KR | 101964428 B1 | | 4/2019 |

* cited by examiner

*Primary Examiner* — Daniel Cavallari
*Assistant Examiner* — Michael J Warmflash
(74) *Attorney, Agent, or Firm* — Maier & Maier, PLLC

(57) ABSTRACT

A dual-mode multi-coil wireless power transfer system includes a control unit and a transmitter unit. The transmitter unit may wirelessly transmit electric power to an external receiver coil. The transmitter unit include a plurality of transmitter modules. Each of the plurality of transmitter modules may operate in at least one of a power transfer mode and a leakage magnetic field shield mode. The control unit controls each of the plurality of transmitter modules to operate in at least one of the power transfer mode and the leakage magnetic field shield mode or to be turned off.

12 Claims, 14 Drawing Sheets

1 ⟹ Power Transfer Mode
2 ⟹ Leakage Magnetic Field Shield Mode
3 ⟹ Turned Off

| | | | |
|---|---|---|---|
| ① ⇨ Power Transfer Mode | | ② ⇨ Leakage Magnetic Field Shield Mode | |
| ③ ⇨ Turned Off | | ⊛ ⇨ Receiver Coil | |

| ① ⇒ Power Transfer Mode | ② ⇒ Leakage Magnetic Field Shield Mode |
| --- | --- |
| ③ ⇒ Turned Off | ⬤ ⇒ Receiver Coil |

| | | |
|---|---|---|
| ① ⇒ Power Transfer Mode | ② ⇒ Leakage Magnetic Field Shield Mode | |
| ③ ⇒ Turned Off | ⬤ ⇒ Receiver Coil | |

| 1 ⇒ Power Transfer Mode | 2 ⇒ Leakage Magnetic Field Shield Mode |
| 3 ⇒ Turned Off | ⊙ ⇒ Receiver Coil |

DUAL-MODE MULTI-COIL WIRELESS POWER TRANSFER SYSTEM

CROSS-REFERENCE TO RELATED APPLICATIONS

This application claims the benefit of Korean Patent Application No. 10-2022-0172961, filed with the Korean Intellectual Property Office on Dec. 12, 2022, the disclosure of which is incorporated herein by reference in its entirety.

TECHNICAL FIELD

The present disclosure relates to a wireless power transfer system that is capable of transmitting electric power wirelessly. Specifically, the present disclosure relates to a wireless power transfer system in which a single transmitter module can simultaneously operate in dual modes (i.e., power transfer mode and leakage magnetic field shield mode).

BACKGROUND

Wireless power transfer (WPT) is widely used in a variety of fields including, for example, small electronic devices, such as smartphones and smart watches, and medical apparatuses. Particularly, studies are underway to apply the wireless power transfer technologies to drones, electric vehicles, railroads, etc., where large electric powers are required.

Generally, electric power is wirelessly transferred via electromagnetic induction between transmitter coils and receiver coils, and the efficiency of power transfer is determined by mutual inductance between the transmitter coils and the receiver coils. The mutual inductance is determined by relative arrangement between the transmitter coils and the receiver coils. Accordingly, the power transfer efficiency has been compromised when there is a misalignment between the transmitter coils and the receiver coils.

To address this issue, the multi coil wireless power transfer system has been introduced to attain a sufficient mutual inductance by providing multiple transmitter coils on a 2-dimensional plane.

Despite the multi coil wireless power transfer system, some of the magnetic field generated by the transmitter coils have still been leaked. The leakage magnetic field have adverse effects on humans and surrounding electric devices. As such, there have been increased demands for possible solutions for removing the leakage magnetic field generated by the multi coil wireless power transfer system.

SUMMARY

To address the above-mentioned issues, the present disclosure enables a single transmitter coil to operate in dual modes (i.e., power transfer mode and leakage magnetic field shield mode), thereby providing a dual-mode multi-coil wireless power transfer system that can reduce the leakage magnetic field without introducing a separate shield coil.

The present disclosure also enables the transmitter coil operating in the leakage magnetic field shield mode to use an electromotive force induced by the leakage magnetic field, thereby providing a dual-mode multi-coil wireless power transfer system that can reduce the leakage magnetic field without introducing a separate power source.

The present disclosure provides a dual-mode multi-coil wireless power transfer system in which the operating mode of the transmitter coil is flexibly determined based on the coefficient of coupling with other transmitter coils.

The dual-mode multi-coil wireless power transfer system in accordance with an embodiment of the present disclosure may include a transmitter unit and a control unit.

The transmitter unit may wirelessly transmit electric power to an external receiver coil. The transmitter unit may include a plurality of transmitter modules, each of the plurality of transmitter modules being operable in at least one of a power transfer mode and a leakage magnetic field shield mode.

The control unit may control each of the plurality of transmitter modules to operate in at least one of the power transfer mode and the leakage magnetic field shield mode or to be turned off.

When a first transmitter module of the plurality of transmitter modules operates in the power transfer mode and a second transmitter module of the plurality of transmitter modules operates in the leakage magnetic field shield mode, the second transmitter module may use an electromotive force induced by the leakage magnetic field generated by the first transmitter module to generate a magnetic field that offsets the leakage magnetic field.

In the dual-mode multi-coil wireless power transfer system in accordance with an embodiment of the present disclosure, each of the plurality of transmitter modules may include a transmitter coil. A third transmitter coil of a third transmitter module of the plurality of transmitter modules and a fourth transmitter coil of a fourth transmitter module of the plurality of transmitter modules may at least partially overlap with each other.

The dual-mode multi-coil wireless power transfer system in accordance with an embodiment of the present disclosure may further include an inverter. The inverter may convert direct current power source to alternating current power source. Each of the plurality of transmitter modules may further include a first input terminal, a second input terminal and a resonance tank. The first input terminal and the second input terminal may be connected to the inverter. The resonance tank may include a serial resonance coil, a variable capacitor, and a parallel resonance capacitor. One end of the serial resonance coil may be connected to the first input terminal. One end of the variable capacitor may be connected to the other end of the serial resonance coil, and the other end of the variable capacitor may be connected to one end of the transmitter coil. One end of the parallel resonance capacitor may be connected to the other end of the serial resonance coil and the one end of the variable capacitor, and the other end of the parallel resonance capacitor may be connected to the second input terminal.

The control unit of the dual-mode multi-coil wireless power transfer system in accordance with an embodiment of the present disclosure may adjust the capacitance of the variable capacitor. When the transmitter module is operated in the power transfer mode, the variable capacitor may have first capacitance. When the transmitter module is operated in the leakage magnetic field shield mode, the variable capacitor may have second capacitance different from the first capacitance.

In the dual-mode multi-coil wireless power transfer system in accordance with an embodiment of the present disclosure, the second capacitance may be smaller than the first capacitance.

The control unit of the dual-mode multi-coil wireless power transfer system in accordance with an embodiment of the present disclosure may compute transmitter-receiver coils coupling coefficients, which are coupling coefficients between the transmitter coils of the plurality of transmitter modules and the receiver coil, and transmitter-transmitter coils coupling coefficients, which are coupling coefficients between the transmitter coils. Based on the transmitter-receiver coils coupling coefficients and the transmitter-transmitter coils coupling coefficients, the control unit may control each of the plurality of transmitter modules to operate in at least one of the power transfer mode and the leakage magnetic field shield mode or to be turned off.

In the dual-mode multi-coil wireless power transfer system in accordance with an embodiment of the present disclosure, a value obtained by multiplying $\sqrt{2}-1$ with the largest value of the transmitter-receiver coils coupling coefficients is defined as a first value. If a coupling coefficient between a fifth transmitter coil of a fifth transmitter module of the plurality of transmitter modules and the receiver coil is greater than or equal to the first value, the fifth transmitter module may be operated in the power transfer mode. If the coupling coefficient between the fifth transmitter coil of the fifth transmitter module of the plurality of transmitter modules and the receiver coil is smaller than the first value, the fifth transmitter module may be operated in the leakage magnetic field shield mode or may be turned off.

In the dual-mode multi-coil wireless power transfer system in accordance with an embodiment of the present disclosure, when a sixth transmitter module of the plurality of transmitter modules does not operate in the power transfer mode and the fifth transmitter module is operated in the power transfer mode, the sixth transmitter module may be operated in the leakage magnetic field shield mode if the coupling coefficient between the fifth transmitter coil and a sixth transmitter coil of the sixth transmitter module is greater than or equal to a second value. When the sixth transmitter module of the plurality of transmitter modules does not operate in the power transfer mode and the fifth transmitter module is operated in the power transfer mode, the sixth transmitter module may be turned off if the coupling coefficient between the fifth transmitter coil and the sixth transmitter coil of the sixth transmitter module is smaller than the second value.

In the dual-mode multi-coil wireless power transfer system in accordance with an embodiment of the present disclosure, the second value may be 0.

In the dual-mode multi-coil wireless power transfer system in accordance with an embodiment of the present disclosure, each of the plurality of transmitter modules may be operated in at least one of the power transfer mode and the leakage magnetic field shield mode or turned off, based on distances between the centers of the transmitter coils of the plurality of transmitter modules and the center of the receiver coil.

A dual-mode multi-coil wireless power transfer system in accordance with another embodiment of the present disclosure may include a transmitter unit and a control unit.

The transmitter unit may wirelessly transmit electric power to an external receiver coil. The transmitter unit may include a plurality of transmitter modules, each of the plurality of transmitter modules including a transmitter coil and a variable capacitor.

Each of the plurality of transmitter modules may be operated in at least one of a power transfer mode and a leakage magnetic field shield mode or turned off. The power transfer mode and the leakage magnetic field shield mode may be determined based on a capacitance value of the variable capacitor. The control unit may adjust the capacitance value.

When a first transmitter module of the plurality of transmitter modules operates in the power transfer mode and a second transmitter module of the plurality of transmitter modules operates in the leakage magnetic field shield mode, the second transmitter module may use the electromotive force induced by a leakage magnetic field generated by the first transmitter module to generate a magnetic field that offsets the leakage magnetic field.

Each of the plurality of transmitter modules of the dual-mode multi-coil wireless power transfer system in accordance with the present embodiment may include a transmitter coil. A third transmitter coil of a third transmitter module of the plurality of transmitter modules and a fourth transmitter coil of a fourth transmitter module of the plurality of transmitter modules may at least partially overlap with each other.

The dual-mode multi-coil wireless power transfer system in accordance with the present embodiment may further include an inverter. The inverter may convert direct current power to alternating current power.

Each of the plurality of transmitter modules may further include a first input terminal, a second input terminal, a serial resonance coil, and a parallel resonance capacitor. The first input terminal and the second input terminal may be connected to the inverter. One end of the serial resonance coil may be connected to the first input terminal. One end of the variable capacitor may be connected to the other end of the serial resonance coil. The other end of the variable capacitor may be connected to one end of the transmitter coil. One end of the parallel resonance capacitor may be connected to the other end of the serial resonance coil and the one end of the variable capacitor. The other end of the parallel resonance capacitor may be connected to the second input terminal.

In the dual-mode multi-coil wireless power transfer system in accordance with the present embodiment, when the transmitter module is operated in the power transfer mode, the variable capacitor may have first capacitance. When the transmitter module is operated in the leakage magnetic field shield mode, the variable capacitor may have second capacitance different from the first capacitance.

In the dual-mode multi-coil wireless power transfer system in accordance with the present embodiment, the second capacitance may be smaller than the first capacitance.

The control unit of the dual-mode multi-coil wireless power transfer system in accordance with the present embodiment may compute transmitter-receiver coils coupling coefficients, which are coupling coefficients between the transmitter coils of the plurality of transmitter modules and the receiver coil, and transmitter-transmitter coils coupling coefficients, which are coupling coefficients between the transmitter coils. Based on the transmitter-receiver coils coupling coefficients and the transmitter-transmitter coils coupling coefficients, the control unit may control each of the plurality of transmitter modules to operate in at least one of the power transfer mode and the leakage magnetic field shield mode or to be turned off.

In the dual-mode multi-coil wireless power transfer system in accordance with the present embodiment, a value obtained by multiplying $\sqrt{2}-1$ with the largest value of the transmitter-receiver coils coupling coefficients is defined as a first value. If a coupling coefficient between a fifth transmitter coil of a fifth transmitter module of the plurality of transmitter modules and the receiver coil is greater than or equal to the first value, the fifth transmitter module may be operated in the power transfer mode. If the coupling coefficient between the fifth transmitter coil of the fifth transmitter module of the plurality of transmitter modules and the receiver coil is smaller than the first value, the fifth transmitter module may be operated in the leakage magnetic field shield mode or may be turned off.

When a sixth transmitter module of the plurality of transmitter modules of the dual-mode multi-coil wireless power transfer system in accordance with the present embodiment does not operate in the power transfer mode and the fifth transmitter module is operated in the power transfer mode, the sixth transmitter module may be operated in the leakage magnetic field shield mode if the coupling coefficient between the fifth transmitter coil and a sixth transmitter coil of the sixth transmitter module is greater than or equal to a second value. When the sixth transmitter module of the plurality of transmitter modules does not operate in the power transfer mode and the fifth transmitter module is operated in the power transfer mode, the sixth transmitter module may be turned off if the coupling coefficient between the fifth transmitter coil and the sixth transmitter coil of the sixth transmitter module is smaller than the second value.

The second value of the dual-mode multi-coil wireless power transfer system in accordance with the present embodiment may be 0.

In the dual-mode multi-coil wireless power transfer system in accordance with the present embodiment, each of the plurality of transmitter modules may be operated in at least one of the power transfer mode and the leakage magnetic field shield mode or turned off, based on distances between the centers of the transmitter coils of the plurality of transmitter modules and the center of the receiver coil.

The present disclosure addresses the conventional shortcomings described above by enabling a single transmitter coil to operate in dual modes (i.e., power transfer mode and leakage magnetic field shield mode), thereby providing a dual mode muti coil wireless power transfer system with improved volume, cost and complexity than the conventional system incorporated with a separate shield coil.

Moreover, the transmitter coil of the present disclosure operating in the leakage magnetic field shield mode utilizes the electromotive force induced by the leakage magnetic field and thus does not use a separate power source, thereby providing a dual mode muti coil wireless power transfer system with a simpler structure.

Furthermore, the present disclosure allows a flexible determination of the operating mode of the transmitter coil based on the coupling coefficient with other transmitter coils, thereby providing a dual mode muti coil wireless power transfer system with a higher shielding effect than the conventional system with a fixed shielding coil position.

DETAILED DESCRIPTION

Figure 1:
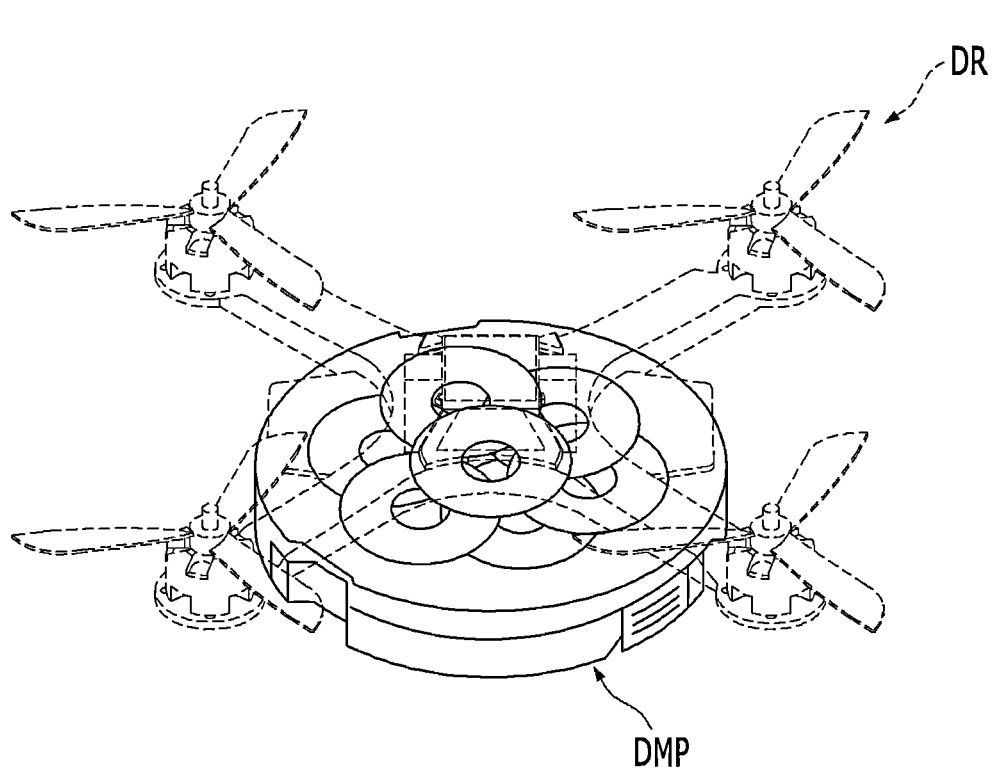
FIG. 1 illustrates an example of a drone being recharged by use of a dual-mode multi-coil wireless power transfer system in accordance with an embodiment of the present disclosure.

Hereinafter, preferred embodiments of the present disclosure will be described in more detail with reference to the attached drawings. In the drawings, the dimensions and ratios of various elements may have been exaggerated for better understanding of the technical features of the present disclosure.

Terms such as "include" and "comprise" are intended to specify the existence of features, numbers, steps, operations, elements, parts, or any combinations thereof and shall not be understood to preemptively exclude the possibility of existence or addition of one or more other features, numbers, steps, operations, elements, parts, or any combinations thereof.

When it is described to be "on" an element, it shall be appreciated to be above or below said element, and not necessarily above said element in a gravitational direction.

When an element is described to be "connected" or "coupled" to another element, it shall include not only the case of said element directly being connected or coupled to the other element but also the case of said element indirectly being connected or coupled to the other element by way of yet another element.

While terms such as "first" and "second" may be used to describe an element, these terms are used solely for the purpose of distinguishing one element from another element and are not intended to define, for example, the nature, order, or sequence of the elements.

Figure 2:
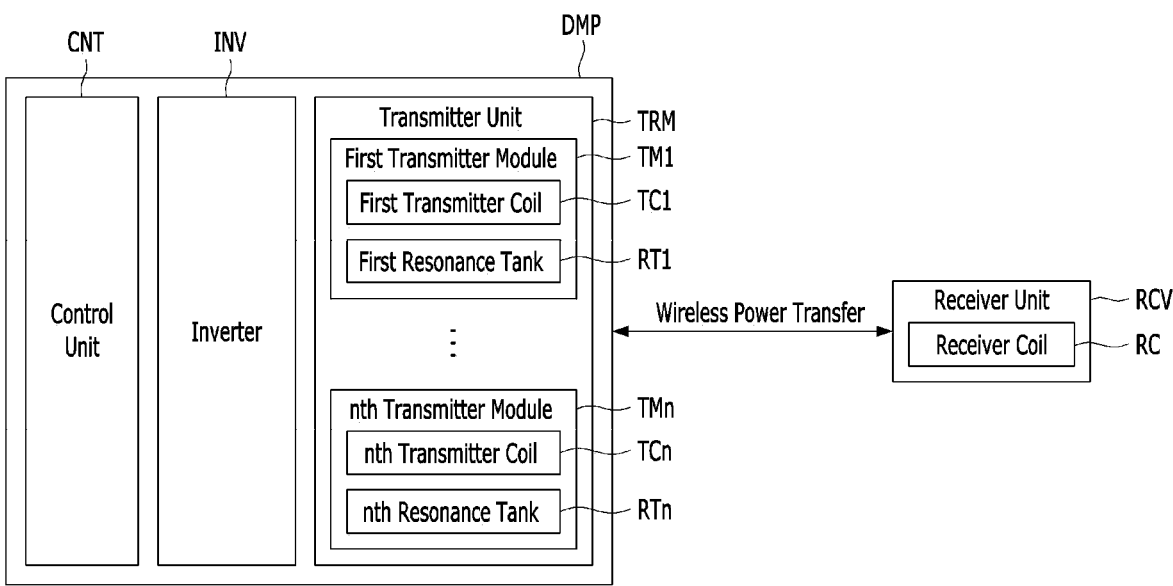
FIG. 2 is an exemplary block diagram illustrating the dual-mode multi-coil wireless power transfer system in accordance with an embodiment of the present disclosure.

FIG. 1 illustrates an example of a drone, DR, being recharged by use of a dual-mode multi-coil wireless power transfer system, DMP, in accordance with an embodiment of the present disclosure. FIG. 2 is an exemplary block diagram illustrating the dual-mode multi-coil wireless power transfer system, DMP, in accordance with an embodiment of the present disclosure.

Referring to FIGS. 1 and 2, the dual-mode multi-coil wireless power transfer system, DMP, may include a transmitter unit, TRM, and a control unit, CNT.

The transmitter unit, TRM, may include a plurality of transmitter modules, TM1-TMn. Each of the plurality of transmitter modules, TM1-TMn, may operate in a power transfer mode and a leakage magnetic field shield mode. The transmitter unit TRM may wirelessly transmit electric power to a receiver coil, RC, of an external receiver unit, RCV.

A first transmitter module TM1 and a second transmitter module TM2 may each be one of the plurality of transmitter modules TM1-TMn. When the first transmitter module TM1 operates in the power transfer mode and the second transmitter module TM2 operates in the leakage magnetic field shield mode, the second transmitter module TM2 may use the electromotive force induced by the leakage magnetic field generated by the first transmitter module TM1 to generate a magnetic field that offsets the leakage magnetic field. That is, by using the dual-mode multi-coil wireless power transfer system DMP in accordance with the present disclosure, the leakage magnetic field may be offset without using a separate power source. Accordingly, the product may have a simpler structure, a smaller volume and a lower manufacturing cost.

In an embodiment of the present disclosure, each of the plurality of transmitter modules TM1-TMn may include a transmitter coil TC1-TCn. A third transmitter module TM3 and a fourth transmitter module TM4 may each be one of the plurality of transmitter modules TM1-TMn. A third transmitter coil TC3 of the third transmitter module TM3 and a fourth transmitter coil TC4 of the fourth transmitter module TM4 may at least partially overlap with each other. By having the third transmitter coil TC3 and the fourth transmitter coil TC4 at least partially overlap with each other, a coupling coefficient between the third transmitter coil TC3 and the fourth transmitter coil TC4 may be greater than or equal to 0. Based on the coupling coefficients between the transmitter coils TC1-TCn, the operation of each of the transmitter modules TM1-TMn may be controlled, which will be described below in more detail.

The control unit CNT may control each of the plurality of transmitter modules TM1-TMn. The control unit CNT may control each of the plurality of transmitter modules TM1-TMn to operate in at least one of the power transfer mode and the leakage magnetic field shield mode or to be turned off.

Figure 3:
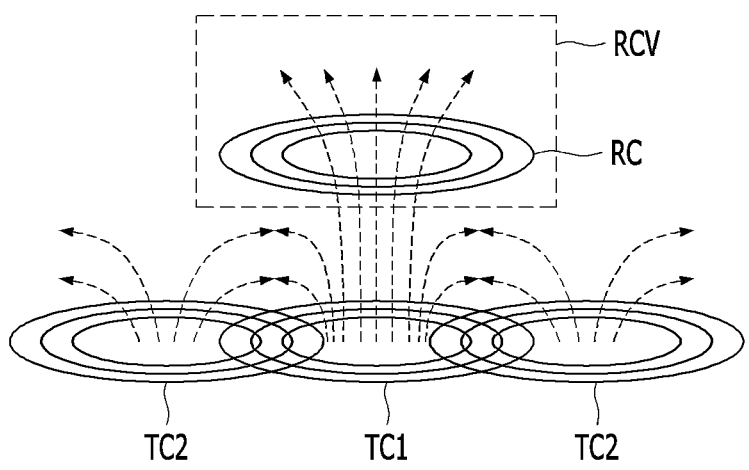
FIG. 3 is an exemplary illustration of a magnetic field generated between a receiver coil of an external receiver unit and some of transmitter coils of the dual-mode multi-coil wireless power transfer system in accordance with an embodiment of the present disclosure.

FIG. 3 is an exemplary illustration of a magnetic field generated between a receiver coil RC of an external receiver unit RCV and some of transmitter coils TC1, TC2 of the dual-mode multi-coil wireless power transfer system DMP in accordance with an embodiment of the present disclosure.

Referring to FIG. 3, the first transmitter module TM1 may operate in the power transfer mode. The second transmitter module TM2 may operate in the leakage magnetic field shield mode. Some of the magnetic field generated by a first transmitter coil TC1 may be received by the receiver coil RC and contribute to the transfer of power, and the remainder of the magnetic field may become the leakage magnetic field. The second transmitter module TM2 may operate to offset the leakage magnetic field by use of the electromotive force induced by the leakage magnetic field generated by the first transmitter coil TC1. A second transmitter coil TC2 of the second transmitter module TM2 may generate a magnetic field offsetting the leakage magnetic field.

Figure 4:
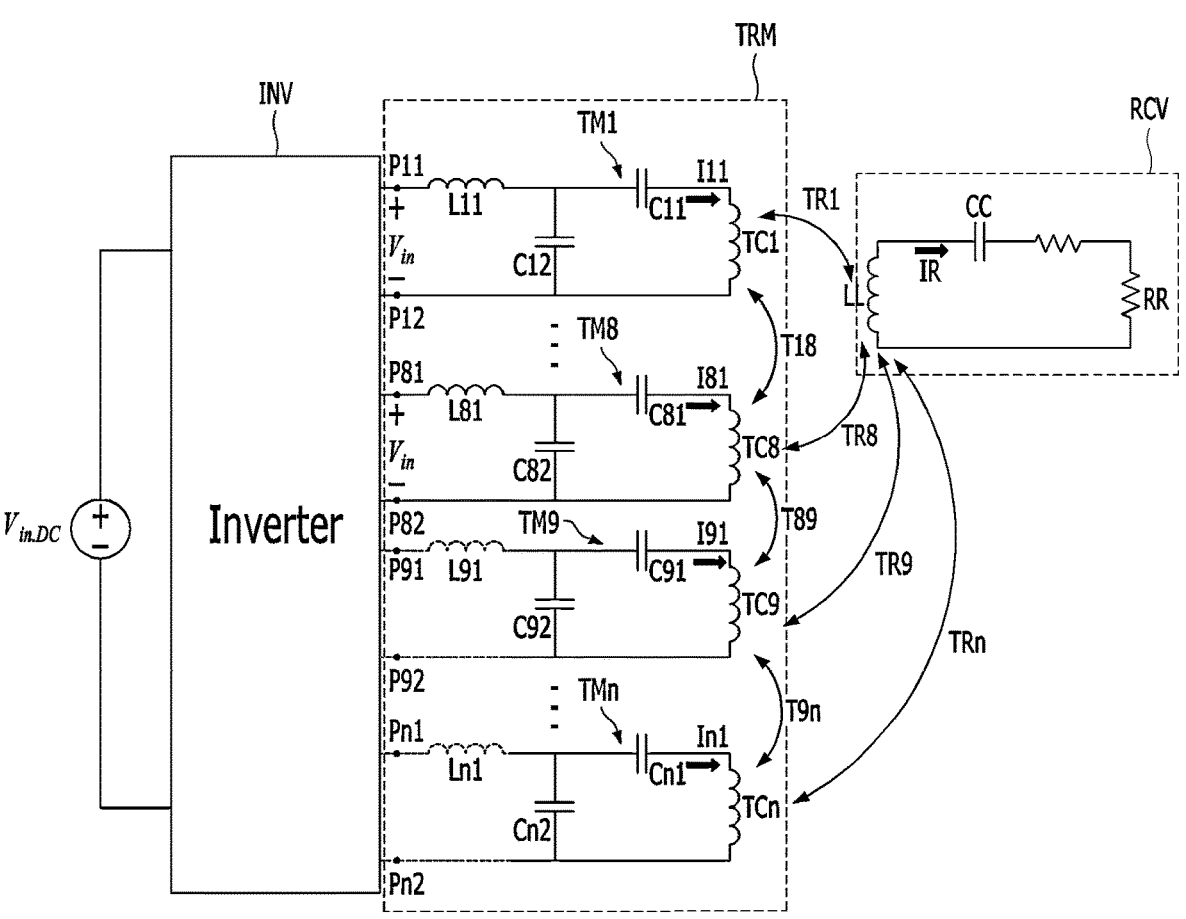
FIG. 4 is an exemplary illustration of portions of the external receiver unit and the dual-mode multi-coil wireless power transfer system in accordance with an embodiment of the present disclosure.
Figure 5:
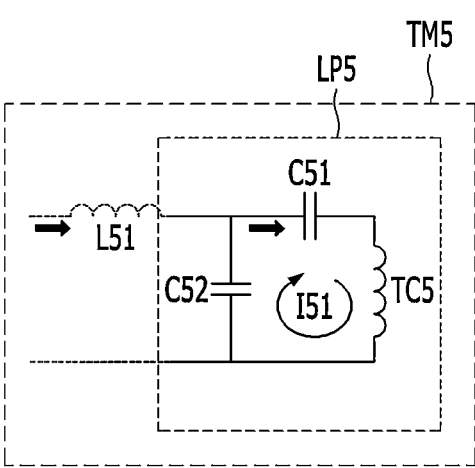
FIG. 5 illustrates a portion of the dual-mode multi-coil wireless power transfer system shown in FIG. 4 to illustrate the transmitter module operating in the leakage magnetic field shield mode without electric power supplied.

FIG. 4 is an exemplary illustration of portions of the external receiver unit RCV and the dual-mode multi-coil wireless power transfer system DMP in accordance with an embodiment of the present disclosure. FIG. 5 illustrates a portion of the dual-mode multi-coil wireless power transfer system shown in FIG. 4 to illustrate the transmitter module operating in the leakage magnetic field shield mode without electric power supplied.

Referring to FIG. 4, some of the transmitter modules TM1-TMm of the transmitter unit TRM may operate in the power transfer mode, and the remaining transmitter modules TM(m+1)-TMn may operate in the leakage magnetic field shield mode. The receiver unit RCV may wirelessly receive electric power from the transmitter unit TRM. The receiver unit RCV may include a receiver coil LL, a receiver capacitor CC and a receiver resistor RR.

In an embodiment of the present disclosure, the dual-mode multi-coil wireless power transfer system DMP may further include an inverter INV. The inverter may convert DC power $v_{in.Dc}$ to AC power $v_{in}$. Each of the plurality of transmitter modules TM1-TMn may further include a first input terminal P11-Pn1, a second input terminal P12-Pn2 and a resonance tank. As the elements included, respectively, in the plurality of transmitter modules TM1-TMn and the connection relations between these elements are substantially identical, the first transmitter module TM1 will be mainly described hereinafter.

The resonance tank RT1 may include a serial resonance coil L11, a variable capacitor C11 and a parallel resonance capacitor C12.

One end of the serial resonance coil L11 may be connected to the first input terminal P11.

One end of the variable capacitor C11 may be connected to the other end of the serial resonance coil L11. The other end of the variable capacitor C11 may be connected to one end of the transmitter coil TC1.

One end of the parallel resonance capacitor C12 may be connected to the other end of the serial resonance coil L11 and the one end of the variable capacitor C11. The other end of the parallel resonance capacitor C12 may be connected to the second input terminal P12.

In an embodiment of the present disclosure, the transmitter unit TRM may include a plurality of transmitter modules TM1-TMn. Each of the plurality of transmitter modules TM1-TMn may include a transmitter coil TC1-TCn and a variable capacitor C11-Cn1. Each of the plurality of transmitter modules TM1-TMn may operate in at least one of the power transfer mode and the leakage magnetic field shield mode or may be turned off. The power transfer mode and the leakage magnetic field shield mode may be determined based on capacitance values of the variable capacitors C11-Cn1. The control unit CNT may adjust the capacitance values of the variable capacitors C11-Cn1.

In an embodiment of the present disclosure, the control unit CNT may compute transmitter-receiver coils coupling coefficients TR1-TRn, which are coupling coefficients between the transmitter coils TC1-TCn of the plurality of transmitter modules TM1-TMn and the receiver coil LL. Moreover, the control unit CNT may compute transmitter-transmitter coils coupling coefficients T11-Tnn, which are coupling coefficients between the transmitter coils TC1-TCn of the plurality of transmitter modules TM1-TMn. Accordingly, based on the transmitter-receiver coils coupling coefficients TR1-TRn and the transmitter-transmitter coils coupling coefficients T11-Tnn, the control unit CNT may control each of the plurality of transmitter modules TM1-TMn to operate in at least one of the power transfer mode and the leakage magnetic field shield mode or to be turned off.

Referring to FIG. 5, in order for a fifth transmitter module TM5 of the plurality of transmitter modules TM1-TMn to operate in the leakage magnetic field shield mode, the capacitance of the variable capacitor C51 of the fifth transmitter module TM5 needs to be adjusted to be reduced. The phase of the magnetic field generated by a fifth transmitter coil TC5 of the fifth transmitter module TM5 may be determined by a current I51 flowing in a fifth loop LP5. The current I51 flowing in the fifth loop LP5 may be determined by the capacitance of a fifth variable capacitor C51.

Specifically, the electromotive force induced by a magnetic field leaked from a sixth transmitter module TM6 of the plurality of transmitter modules TM1-TMn that operates in the power transfer mode may be applied to the fifth loop LP5. Moreover, the fifth transmitter coil TC5 of the fifth transmitter module TM5 and a sixth transmitter coil TC6 of the sixth transmitter module TM6 may at least partially overlap with each other. Accordingly, the voltage applied to the fifth loop LP5 by the induced electromotive force may be determined using the below mathematical expression.

$$V_{ind} = -j\omega(-M)I_{TX}$$ [Mathematical Expression 1]

$V_{ind}$ may be a voltage value applied to the fifth loop LP5 by the induced electromotive force. M may be a mutual inductance between the fifth transmitter coil TC5 of the fifth transmitter module TM5 and the sixth transmitter coil TC6 of the sixth transmitter module TM6. $I_{TX}$ may be a current value flowing in the sixth transmitter coil TC6 of the sixth transmitter module TM6 that operates in the power transfer mode.

Meanwhile, the impedance of the fifth loop LP5 of the fifth transmitter module TM5 may be determined using the below mathematical expression.

$$Z_{sh} = j\omega L_{Tx} + \frac{1}{j\omega C_{sh}} + R_{ptx}$$ [Mathematical Expression 2]

$Z_{Sh}$ may be an impedance of the fifth loop LP5 of the fifth transmitter module TM5. $C_{Sh}$ may be a composite capacitance of the parallel resonance capacitor C52 and the variable capacitor C51. $L_{Tx}$ may be an inductance of the fifth transmitter coil TC5. Accordingly, the current I51 flowing in the fifth loop LP5 may be determined using the below mathematical expression.

$$I_{sh} = \frac{V_{ind}}{Z_{sh}} = \frac{-j\omega(-M)I_{TX}}{j\omega L_{tx} + \frac{1}{j\omega C_{sh}} + R_{ptx}}$$ [Mathematical Expression 3]

$I_{Sh}$ may be a current value flowing in the fifth loop LP5. Mathematical Expression 3 may be approximated in a capacitance region using the below mathematical expression.

$$I_{sh} = \frac{V_{ind}}{Z_{sh}} = \frac{-j\omega(-M)I_{TX}}{\frac{1}{j\omega C_{sh}} + R_{PTx}} \cong \omega^2 C_{sh}(-M)I_{Tx}$$ [Mathematical Expression 4]

According to Mathematical Expression 4, the current I51 flowing in the fifth loop LP5 in the capacitance region may be determined by the composite capacitance ($C_{Sh}$), which may be determined by the capacitance ($C_s$) of the variable capacitor C51. As a result, the current ($I_{Sh}$) flowing in the fifth loop LP5 may be determined the capacitance ($C_s$) of the variable capacitor C51.

Meanwhile, the current I51 flowing in the fifth loop LP5 has an opposite phase to that of the current I61 flowing in the sixth transmitter coil TC6 of the sixth transmitter module TM6. Therefore, the magnetic field generated by the fifth transmitter coil TC5 may cancel or offset the leakage magnetic field generated by the sixth transmitter module TM6.

Meanwhile, Mathematical Expression 3 may be approximated to the below mathematical expression in an inductive region.

$$I_{sh} = \frac{V_{ind}}{Z_{sh}} = \frac{-j\omega(-M)I_{Tx}}{j\omega L_{Tx} + R_{PTx}} \cong \frac{-(-M)I_{Tx}}{L_{Tx}}$$ [Mathematical Expression 5]

According to Mathematical Expression 5, the current I51 flowing in the fifth loop LP5 has the same phase as that of the current I61 flowing in the sixth transmitter coil TC6 of the sixth transmitter module TM6. Therefore, the magnetic field generated by the fifth transmitter coil TC5 may enhance the leakage magnetic field generated by the sixth transmitter module TM6.

Therefore, in order to allow the fifth transmitter module TM5 to operate in the leakage magnetic field shield mode, the variable capacitor C51 needs to be controlled in such a way that the capacitance ($C_s$) thereof is reduced.

In an embodiment of the present disclosure, the control unit CNT may adjust the capacitance of the variable capacitor Cn1. When the transmitter module TMn is operated in the power transfer mode, the variable capacitor CMn may have first capacitance. When the transmitter module TMn is operated in the leakage magnetic field shield mode, the variable capacitor CMn may have second capacitance. The first capacitance may be different from the second capacitance. That is, by adjusting the capacitance of the variable capacitor Cn1, the control unit CNT may adjust the current flowing in the transmitter coil TCn.

In an embodiment of the present disclosure, the second capacitance may be smaller than the first capacitance. That is, by controlling the capacitance of the variable capacitor Cn1 to be reduced, the magnetic field for offsetting the leakage magnetic field may be generated by the transmitter coil TCn.

In an embodiment of the present disclosure, each of the plurality of transmitter modules TM1-TMn may be controlled to be operated in at least one of the power transfer mode and the leakage magnetic field shield mode or to be turned off, based on the largest value of the transmitter-receiver coils coupling coefficients TR1-TRn.

For wireless power transfer, the condition in which the power transfer efficiency would be higher when two transmitter modules are used than when one transmitter module is used may be represented with the below mathematical expression.

$$k_2 > \frac{\sqrt{2}-1}{1} \cdot k_1$$

[Mathematical Expression 6]

$K_1$ may be the largest value among the transmitter-receiver coils coupling coefficients TR1-TRn. $K_2$ may be the second largest value among the transmitter-receiver coils coupling coefficients TR1-TRn.

It can be seen that the power transfer efficiency is higher by using 2 transmitter modules than by using 1 transmitter module for wireless power transfer when Mathematical Expression 6 is satisfied. By contrast, if Mathematical Expression 6 is not satisfied, using 2 transmitter modules for wireless power transfer may result in a lower power transfer efficiency than using 1 transmitter module.

Therefore, the control unit CNT may control each of the plurality of transmitter modules TM1-TMn using Mathematical Expression 6 and the transmitter-receiver coils coupling coefficients TR1-TRn so that the wireless power transfer is efficiently made between the transmitter coil TC and the receiver coil RC.

In an embodiment of the present disclosure, a value obtained by multiplying $\sqrt{2}-1$ with the largest value of the transmitter-receiver coils coupling coefficients TR1-TRn is defined as a first value. A seventh transmitter module TM7 may be any one of the plurality of transmitter modules TM1-TMn. In the case where a coupling coefficient TR7 between a seventh transmitter coil TC7 of the seventh transmitter module TM7 and the receiver coil RC is greater than or equal to the first value, the seventh transmitter module TM7 may be operated in the power transfer mode. In the case where the coupling coefficient TR7 between the seventh transmitter coil TC7 and the receiver coil RC is smaller than the first value, the seventh transmitter module TM7 may be operated in the leakage magnetic field shield mode or turned off. If the seventh transmitter module TM7 operated in the power transfer mode even though the coupling coefficient TR7 between the seventh transmitter coil TC7 of the seventh transmitter module TM7 and the receiver coil RC is smaller than the first value, the power transfer efficiency might be dropped.

In an embodiment of the present disclosure, an eighth transmitter module TM8 may be one of the plurality of transmitter modules TM1-TMn and may not operate in the power transfer mode. A ninth transmitter module TM9 may operate in the power transfer mode. Here, in the case where a coupling coefficient T89 between an eighth transmitter coil TC8 of the eighth transmitter module TM8 and a ninth transmitter coil TC9 of the ninth transmitter module TM9 is greater than or equal to a second value, the eighth transmitter module TM8 may be operated in the leakage magnetic field shield mode. On the contrary, in the case where the coupling coefficient T89 between the eighth transmitter coil TC8 of the eighth transmitter module TM8 and the ninth transmitter coil TC9 of the ninth transmitter module TM9 is smaller than the second value, the eighth transmitter module TM8 may be turned off.

For instance, when the coupling coefficient T89 between the eighth transmitter coil TC8 and the ninth transmitter coil TC9 is greater than or equal to the second value, the eighth transmitter coil TC8 and the ninth transmitter coil TC9 may be determined to be adjacent to each other. Accordingly, the electromotive force induced by the leakage magnetic field generated by the ninth transmitter coil TC9 may be applied to the eighth transmitter module TM8. Therefore, the eighth transmitter module TM8 may operate in the leakage magnetic field shield mode, and the magnetic field generated by the eighth transmitter coil TC8 may offset the leakage magnetic field generated by the ninth transmitter coil TC9.

In an embodiment of the present disclosure, the second value may be 0.

In an embodiment of the present disclosure, each of the plurality of transmitter modules TM'-TMn may be operated in at least one of the power transfer mode and the leakage magnetic field shield mode or turned off, based on distances between the centers of the transmitter coils TC1-TCn of the plurality of transmitter modules TM1-TMn and the center of the receiver coil RC. That is, a transmitter module corresponding to a transmitter coil that is close to the receiver coil RC may operate in the power transfer mode, and a transmitter module corresponding to a transmitter coil that is relatively distanced from the receiver coil RC may operate in the leakage magnetic field shield mode or may be turned off.

Figure 6:
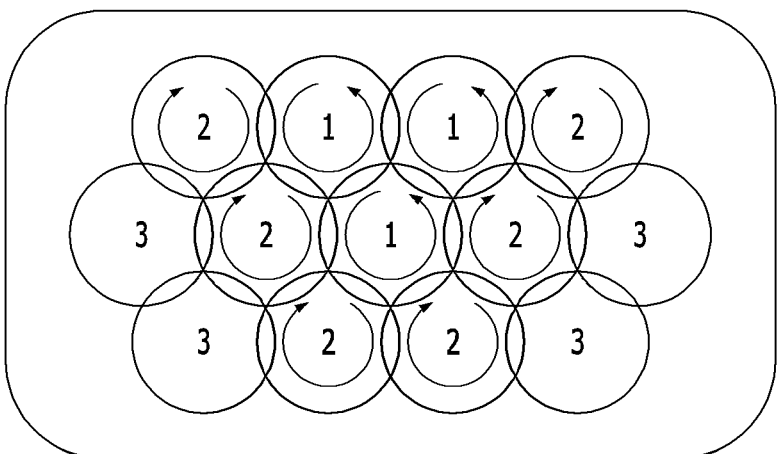
FIG. 6 is an exemplary illustration of transmitter coils of transmitter modules operating in the power transfer mode, transmitter modules operating in the leakage magnetic field shield mode, and turned-off transmitter modules.

FIG. 6 is an exemplary illustration of transmitter coils of transmitter modules operating in the power transfer mode, transmitter modules operating in the leakage magnetic field shield mode, and turned-off transmitter modules. As seen in FIG. 6, transmitter modules adjacent to the transmitter modules operating in the power transfer mode may operate in the leakage magnetic field shield mode. Transmitter modules that are not adjacent to the transmitter modules operating in the power transfer mode may be turned off.

FIGS. 7 to 10 are exemplary illustrations of operations of the plurality of transmitter modules or resulting leakage magnetic field shielding effects.

Figure 7A:
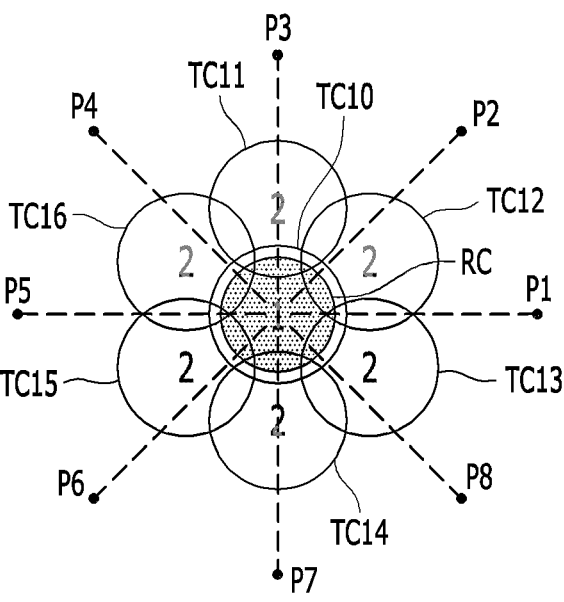
FIG. 7A is an exemplary illustration of operations of the plurality of transmitter modules or resulting leakage magnetic field shielding effects.

Referring to FIG. 7A, a tenth transmitter coil TC10 and the receiver coil RC may overlap with each other. Here, the tenth transmitter coil TC10 may operate in the power transfer mode. The transmitter coils TC11-TC16 adjacent to the tenth transmitter coil TC10 may operate in the leakage magnetic field shield mode. Measurement points P1-P8, which are points for measuring the leakage magnetic field, may be separated by 700 mm from the center of the tenth transmitter coil TC10. Adjacent two measurement points and the center of the tenth transmitter coil TC10 may form a 45-degree angle.

Figure 7B:
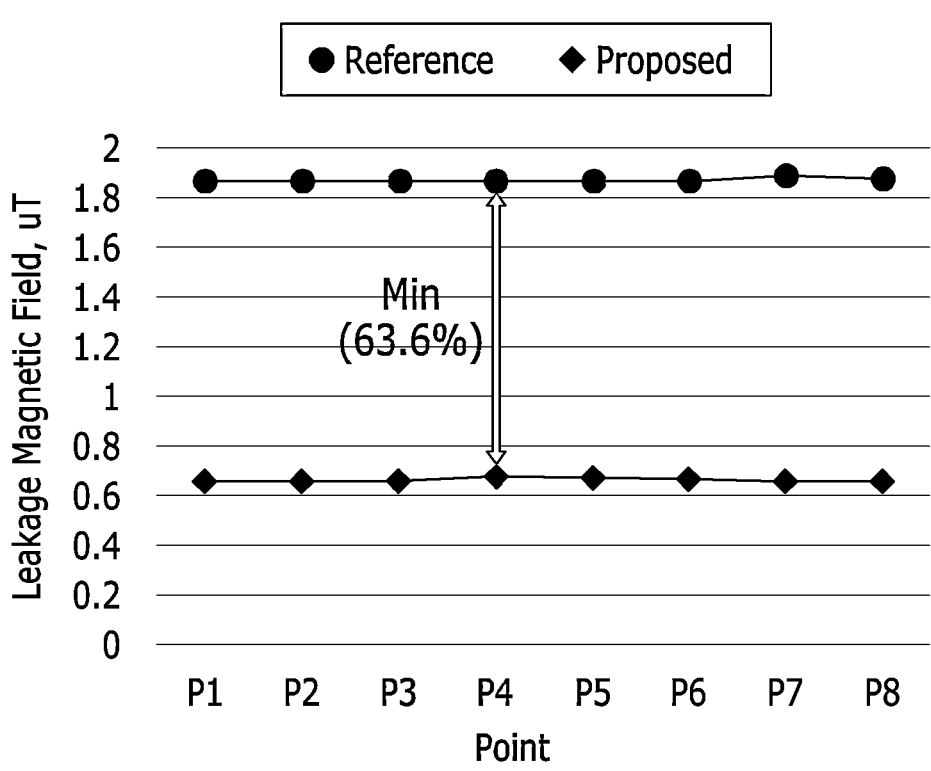
FIG. 7B is an exemplary illustration of operations of the plurality of transmitter modules or resulting leakage magnetic field shielding effects.

Referring to FIG. 7B, each illustrated Reference is the leakage magnetic field measured at each of the measurement points P1-P8 when the transmitter coils TC11-TC16 adjacent to the tenth transmitter coil TC10 do not operate in the leakage magnetic field shield mode. Each illustrated Proposed is the leakage magnetic field measured at each of the measurement points P1-P8 when the transmitter coils TC11-TC16 adjacent to the tenth transmitter coil TC10 operate in the leakage magnetic field shield mode. When the transmitter coils TC11-TC16 adjacent to the tenth transmitter coil TC10 operate in the leakage magnetic field shield mode (i.e., as shown with Proposed), the leakage magnetic field shield effect is observed to be higher by at least 63.6% and average 64.5% than when not operated in the leakage magnetic field shield mode (i.e., as shown with Reference).

Figure 8A:
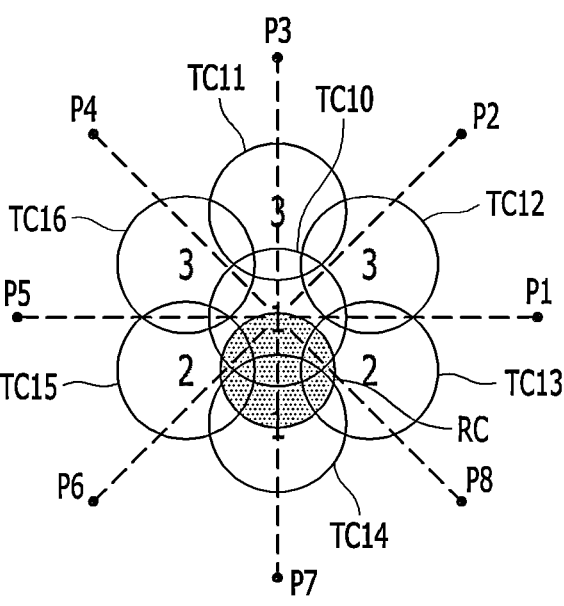
FIG. 8A is an exemplary illustration of operations of the plurality of transmitter modules or resulting leakage magnetic field shielding effects.

Referring to FIG. 8A, the receiver coil RC may be arranged between the center of the tenth transmitter coil TC10 and the center of the fourteenth transmitter coil TC14. Here, the tenth transmitter coil TC10 and the fourteenth transmitter coil TC14 may operate in the power transfer mode. The transmitter coils TC13, TC15 adjacent to the tenth transmitter coil TC10 and the fourteenth transmitter coil TC14 may operate in the leakage magnetic field shield mode. The measurement points P1-P8, which are points for measuring the leakage magnetic field, may be separated by 700 mm from the center of the tenth transmitter coil TC10.

Adjacent two measurement points and the center of the tenth transmitter coil TC10 may form a 45-degree angle.

Figure 8B:
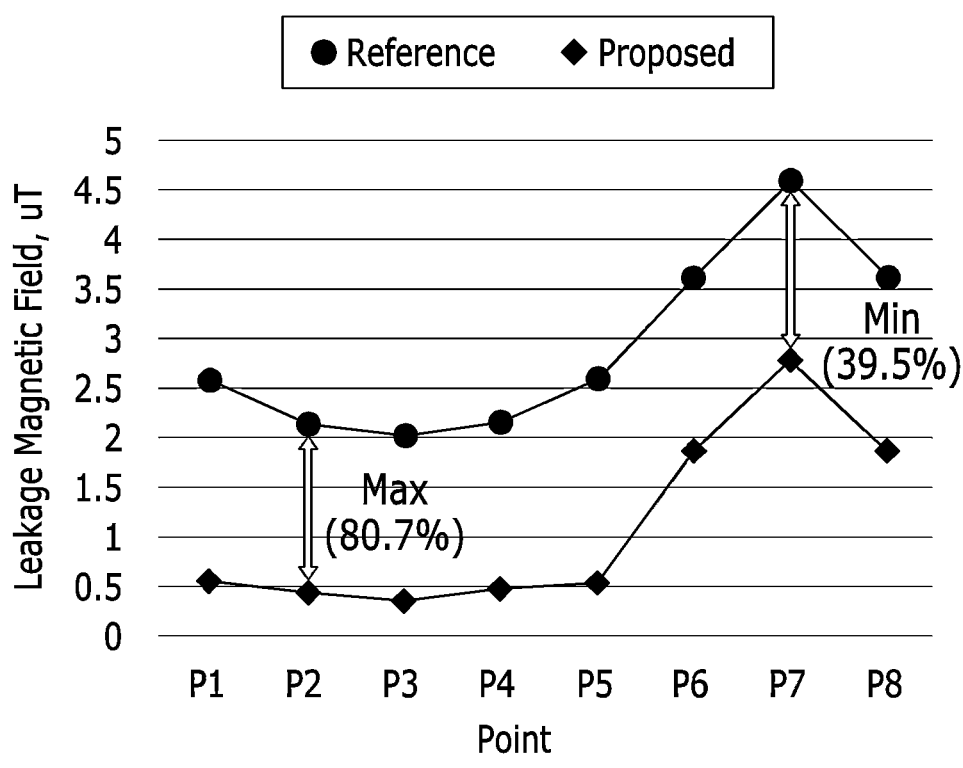
FIG. 8B is an exemplary illustration of operations of the plurality of transmitter modules or resulting leakage magnetic field shielding effects.

Referring to FIG. 8B, each illustrated Reference is the leakage magnetic field measured at each of the measurement points P1-P8 when the thirteenth transmitter coil TC13 and the fifteenth transmitter coil TC15 do not operate in the leakage magnetic field shield mode. Each illustrated Proposed is the leakage magnetic field measured at each of the measurement points P1-P8 when the thirteenth transmitter coil TC13 and the fifteenth transmitter coil TC15 operate in the leakage magnetic field shield mode. When the thirteenth transmitter coil TC13 and the fifteenth transmitter coil TC15 operate in the leakage magnetic field shield mode (i.e., as shown with Proposed), the leakage magnetic field shield effect is observed to be higher by at least 39.5%, average 67.7% and at most 80.7% than when not operated in the leakage magnetic field shield mode (i.e., as shown with Reference).

Figure 9A:
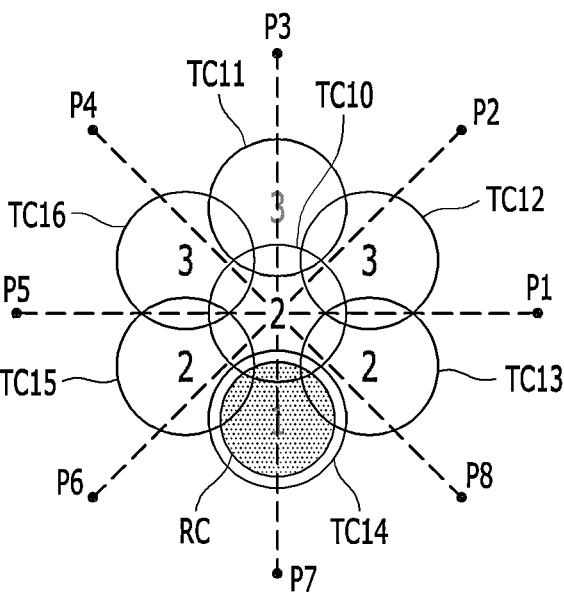
FIG. 9A is an exemplary illustration of operations of the plurality of transmitter modules or resulting leakage magnetic field shielding effects.

Referring to FIG. 9A, the fourteenth transmitter coil TC14 and the receiver coil RC may overlap with each other. Here, the fourteenth transmitter coil TC14 may operate in the power transfer mode. The transmitter coils TC10, TC13, TC15 adjacent to the fourteenth transmitter coil TC14 may operate in the leakage magnetic field shield mode. Measurement points P1-P8, which are points for measuring the leakage magnetic field, may be separated by 700 mm from the center of the tenth transmitter coil TC10. Adjacent two measurement points and the center of the tenth transmitter coil TC10 may form a 45-degree angle.

Figure 9B:
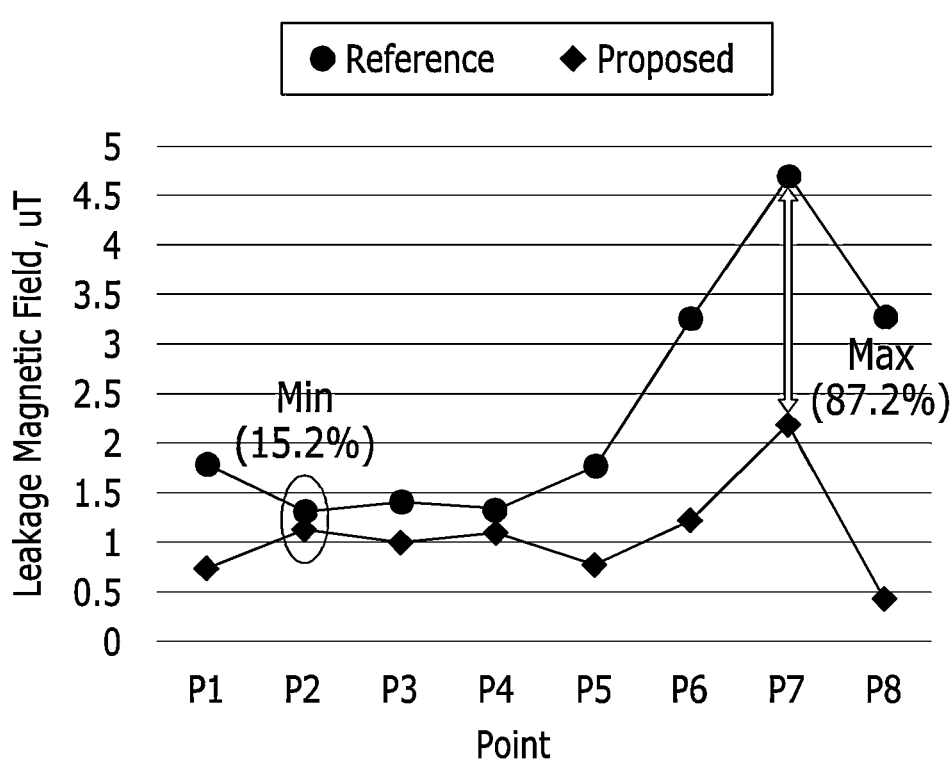
FIG. 9B is an exemplary illustration of operations of the plurality of transmitter modules or resulting leakage magnetic field shielding effects.

Referring to FIG. 9B, each illustrated Reference is the leakage magnetic field measured at each of the measurement points P1-P8 when the transmitter coils TC10, TC13, TC15 adjacent to the fourteenth transmitter coil TC14 do not operate in the leakage magnetic field shield mode. Each illustrated Proposed is the leakage magnetic field measured at each of the measurement points P1-P8 when the transmitter coils TC10, TC13, TC15 adjacent to the fourteenth transmitter coil TC14 operate in the leakage magnetic field shield mode. When the transmitter coils TC10, TC13, TC15 adjacent to the fourteenth transmitter coil TC14 operate in the leakage magnetic field shield mode (i.e., as shown with Proposed), the leakage magnetic field shield effect is observed to be higher by at least 15.2%, average 36.3% and at most 87.2% than when not operated in the leakage magnetic field shield mode (i.e., as shown with Reference).

Figure 10A:
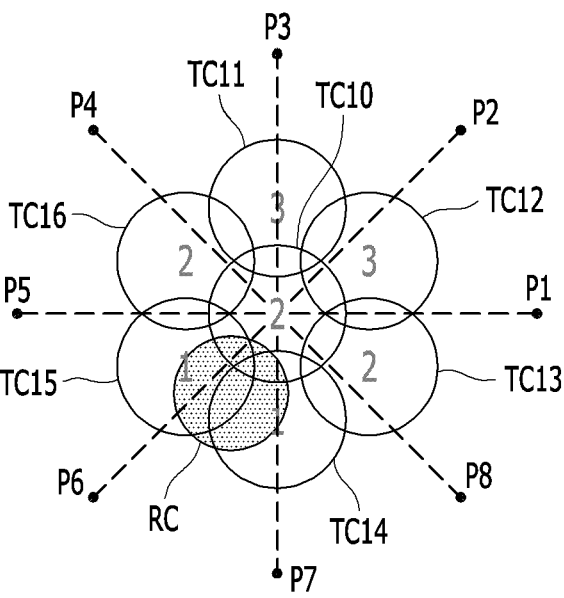
FIG. 10A is an exemplary illustration of operations of the plurality of transmitter modules or resulting leakage magnetic field shielding effects.

Referring to FIG. 10A, the receiver coil RC may be arranged between the center of the fourteenth transmitter coil TC14 and the center of the fifteenth transmitter coil TC15. Here, the fourteenth transmitter coil TC14 and the fifteenth transmitter coil TC15 may operate in the power transfer mode. The transmitter coils TC10, TC13, TC16 adjacent to the fourteenth transmitter coil TC14 and the fifteenth transmitter coil TC15 may operate in the leakage magnetic field shield mode. The measurement points P1-P8, which are points for measuring the leakage magnetic field, may be separated by 700 mm from the center of the tenth transmitter coil TC10. Adjacent two measurement points and the center of the tenth transmitter coil TC10 may form a 45-degree angle.

Figure 10B:
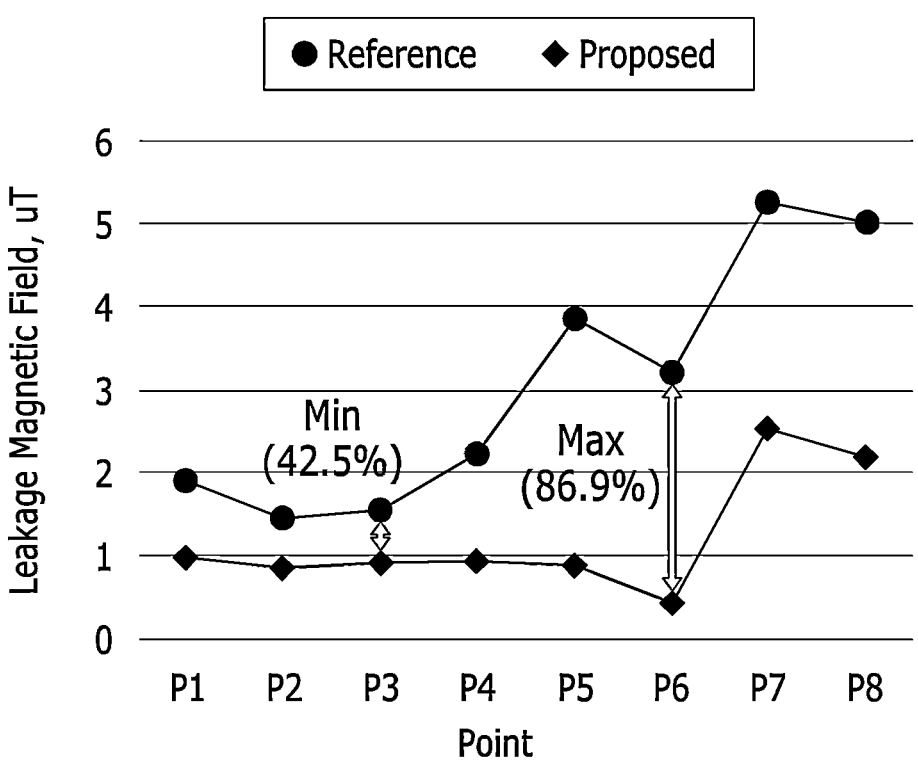
FIG. 10B is an exemplary illustration of operations of the plurality of transmitter modules or resulting leakage magnetic field shielding effects.

Referring to FIG. 10B, each illustrated Reference is the leakage magnetic field measured at each of the measurement points P1-P8 when the transmitter coils TC10, TC13, TC16 adjacent to the fourteenth transmitter coil TC14 and the fifteenth transmitter coil TC15 do not operate in the leakage magnetic field shield mode. Each illustrated Proposed is the leakage magnetic field measured at each of the measurement points P1-P8 when the transmitter coils TC10, TC13, TC16 adjacent to the fourteenth transmitter coil TC14 and the fifteenth transmitter coil TC15 operate in the leakage magnetic field shield mode. When the transmitter coils TC10, TC13, TC16 adjacent to the fourteenth transmitter coil TC14 and the fifteenth transmitter coil TC15 operate in the leakage magnetic field shield mode (i.e., as shown with Proposed), the leakage magnetic field shield effect is observed to be higher by at least 42.5%, average 58.2% and at most 86.9% than when not operated in the leakage magnetic field shield mode (i.e., as shown with Reference).

As appreciated through the description with reference to FIGS. 7 to 10, the leakage magnetic field shield effect is higher by an average of 56.6% when the leakage magnetic field is shielded using the dual-mode multi-coil wireless power transfer system DMP in accordance with the present disclosure than when the dual-mode multi-coil wireless power transfer system DMP in accordance with the present disclosure is not used. Therefore, with the present disclosure, the leakage magnetic field, which may be hazardous to the human body and adversely affect surrounding electronic devices, may be effectively removed.

While certain embodiments of the present disclosure have been described, anyone of ordinary skill in the art to which the present disclosure pertains would appreciate that various modifications or permutations to the present disclosure may be available without departing from the technical ideas and scope of the present disclosure described in the appended claims. Moreover, it should be appreciated that the embodiments described in the present disclosure are not intended to limit the technical ideas of the present disclosure thereto and that the claims appended below and every other technical idea within the equivalent claim scope are included in the scope of protection of the present disclosure.

DESCRIPTION OF ELEMENTS

| | |
|---|---|
| DMP: dual-mode multi-coil wireless power transfer system | |
| TRM: transmitter unit | RCV: receiver unit |
| INV: inverter | CNT: control unit |
| TM: transmitter module | TC: transmitter coil |
| RC: receiver coil | |

What is claimed is:

1. A dual-mode multi-coil wireless power transfer system, comprising:

a transmitter unit configured to wirelessly transmit electric power to an external receiver coil and comprising a plurality of transmitter modules, each of the plurality of transmitter modules configured to operate in at least one of a power transfer mode and a leakage magnetic field shield mode;

a control unit configured to control each of the plurality of transmitter modules to operate in at least one of the power transfer mode and the leakage magnetic field shield mode or turned off; and an inverter configured to convert direct current power to alternating current power;

wherein when a first transmitter module of the plurality of transmitter modules operates in the power transfer mode and a second transmitter module of the plurality of transmitter modules operates in the leakage magnetic field shield mode, the second transmitter module uses an electromotive force induced by a leakage magnetic field generated by the first transmitter module to generate a magnetic field offsetting the leakage magnetic field, wherein each of the plurality of transmitter modules comprises a transmitter coil, and wherein a third transmitter coil of a third transmitter module of the plurality of transmitter modules and a fourth transmitter coil of a fourth transmitter module of the plurality of transmitter modules are disposed to at least partially overlap with each other, wherein each of the plurality of transmitter modules further comprises a first input terminal, a second input terminal and a resonance tank, wherein the first input terminal and the second input terminal are connected to the inverter, and wherein the resonance tank comprises:

a series resonance coil, one end of the series resonance coil being connected to the first input terminal;

a variable capacitor, one end of the variable capacitor being connected to the other end of the series resonance coil, the other end of the variable capacitor being connected to one end of the transmitter coil; and a parallel resonance capacitor, one end of the parallel resonance capacitor being connected to the other end of the series resonance coil and the one end of the variable capacitor, the other end of the parallel resonance capacitor being connected to the second input terminal, wherein the control unit is configured to compute transmitter-receiver coils coupling coefficients, the transmitter-receiver coils coupling coefficients being coupling coefficients between transmitter coils of the plurality of transmitter modules and the receiver coil, and transmitter-transmitter coils coupling coefficients, the transmitter-transmitter coils coupling coefficients being coupling coefficients between the transmitter coils, and to control each of the plurality of transmitter modules to operate in at least one of the power transfer mode and the leakage magnetic field shield mode or turned off based on the transmitter-receiver coils coupling coefficients and the transmitter-transmitter coils coupling coefficients, wherein a value obtained by multiplying $\sqrt{2}-1$ with a largest value of the transmitter-receiver coils coupling coefficients is defined as a first value, and if a coupling coefficient between a fifth transmitter coil of a fifth transmitter module of the plurality of transmitter modules and the receiver coil is greater than or equal to the first value, the fifth transmitter module is operated in the power transfer mode, and if the coupling coefficient between the fifth transmitter coil of the fifth transmitter module of the plurality of transmitter modules and the receiver coil is smaller than the first value, the fifth transmitter module is operated in the leakage magnetic field shield mode or turned off.

2. The dual-mode multi-coil wireless power transfer system as set forth in claim 1, wherein the control unit is configured to adjust a capacitance of the variable capacitor, wherein the variable capacitor has a first capacitance when the respective transmitter module operates in the power transfer mode, and wherein the variable capacitor has a second capacitance when the respective transmitter module operates in the leakage magnetic field shield mode, the second capacitance being different from the first capacitance.

3. The dual-mode multi-coil wireless power transfer system as set forth in claim 2, wherein the second capacitance is smaller than the first capacitance.

4. The dual-mode multi-coil wireless power transfer system as set forth in claim 1, wherein when a sixth transmitter module of the plurality of transmitter modules does not operate in the power transfer mode and the fifth transmitter module is operated in the power transfer mode, the sixth transmitter module is operated in the leakage magnetic field shield mode if a coupling coefficient between the fifth transmitter coil and a sixth transmitter coil of the sixth transmitter module is greater than or equal to a second value, and the sixth transmitter module is turned off if the coupling coefficient between the fifth transmitter coil and the sixth transmitter coil of the sixth transmitter module is smaller than the second value.

5. The dual-mode multi-coil wireless power transfer system as set forth in claim 4, wherein the second value is 0.

6. The dual-mode multi-coil wireless power transfer system as set forth in claim 2, wherein each of the plurality of transmitter modules is operated in at least one of the power transfer mode and the leakage magnetic field shield mode or turned off, based on distances between centers of the transmitter coils of the plurality of transmitter modules and a center of the receiver coil.

7. A dual-mode multi-coil wireless power transfer system, comprising:

a transmitter unit configured to wirelessly transmit electric power to an external receiver coil and comprising a plurality of transmitter modules, each of the plurality of transmitter modules comprising a transmitter coil and a variable capacitor;

a control unit configured to adjust a capacitance value, wherein each of the plurality of transmitter modules is operated in at least one of a power transfer mode and a leakage magnetic field shield mode or turned off, and wherein the power transfer mode and the leakage magnetic field shield mode are determined based on the capacitance value of the variable capacitor; and an inverter configured to convert direct current power to alternating current power, wherein when a first transmitter module of the plurality of transmitter modules operates in the power transfer mode and a second transmitter module of the plurality of transmitter modules operates in the leakage magnetic field shield mode, the second transmitter module uses an electromotive force induced by a leakage magnetic field generated by the first transmitter module to generate a magnetic field offsetting the leakage magnetic field, wherein each of the plurality of transmitter modules comprises a transmitter coil, and wherein a third transmitter coil of a third transmitter module of the plurality of transmitter modules and a fourth transmitter coil of a fourth transmitter module of the plurality of transmitter modules at least partially overlap with each other, wherein each of the plurality of transmitter modules further comprises a first input terminal, a second input terminal, a series resonance coil and a parallel resonance capacitor, and wherein the first input terminal and the second input terminal are connected to the inverter, and one end of the series resonance coil is connected to the first input terminal, and one end of the variable capacitor is connected to the other end of the series resonance coil, and the other end of the variable capacitor is connected to one end of the transmitter coil, and one end of the parallel resonance capacitor is connected to the other end of the series resonance coil and the one end of the variable capacitor, and the other end of the parallel resonance capacitor is connected to the second input terminal, wherein the control unit is configured to compute transmitter-receiver coils coupling coefficients, the transmitter-receiver coils coupling coefficients being coupling coefficients between transmitter coils of the plurality of transmitter modules and the receiver coil, and transmitter-transmitter coils coupling coefficients, the transmitter-transmitter coils coupling coefficients being coupling coefficients between the transmitter coils, and to control each of the plurality of transmitter modules to operate in at least one of the power transfer mode and the leakage magnetic field shield mode or turned off based on the transmitter-receiver coils coupling coefficients and the transmitter-transmitter coils coupling coefficients, wherein a value obtained by multiplying $\sqrt{2}-1$ with a largest value of the transmitter-receiver coils coupling coefficients is defined as a first value, and if a coupling coefficient between a fifth transmitter coil of a fifth transmitter module of the plurality of transmitter modules and the receiver coil is greater than or equal to the first value, the fifth transmitter module is operated in the power transfer mode, and if the coupling coefficient between the fifth transmitter coil of the fifth transmitter module of the plurality of transmitter modules and the receiver coil is smaller than the first value, the fifth transmitter module is operated in the leakage magnetic field shield mode or turned off.

8. The dual-mode multi-coil wireless power transfer system as set forth in claim 7, wherein the variable capacitor has a first capacitance when the respective transmitter module operates in the power transfer mode, and wherein the variable capacitor has a second capacitance when the respective transmitter module operates in the leakage magnetic field shield mode, the second capacitance being different from the first capacitance.

9. The dual-mode multi-coil wireless power transfer system as set forth in claim 8, wherein the second capacitance is smaller than the first capacitance.

10. The dual-mode multi-coil wireless power transfer system as set forth in claim 7, wherein when a sixth transmitter module of the plurality of transmitter modules does not operate in the power transfer mode and the fifth transmitter module is operated in the power transfer mode, the sixth transmitter module is operated in the leakage magnetic field shield mode if a coupling coefficient between the fifth transmitter coil and a sixth transmitter coil of the sixth transmitter module is greater than or equal to a second value, and the sixth transmitter module is turned off if the coupling coefficient between the fifth transmitter coil and the sixth transmitter coil of the sixth transmitter module is smaller than the second value.

11. The dual-mode multi-coil wireless power transfer system as set forth in claim 10, wherein the second value is 0.

12. The dual-mode multi-coil wireless power transfer system as set forth in claim 8, wherein each of the plurality of transmitter modules is operated in at least one of the power transfer mode and the leakage magnetic field shield mode or turned off, based on distances between centers of the transmitter coils of the plurality of transmitter modules and a center of the receiver coil.

* * * * *